United States Patent [19]

Sanner

[11] Patent Number: 4,757,386
[45] Date of Patent: Jul. 12, 1988

[54] DUAL CHANNEL SIGNAL PROCESSING SYSTEM FOR AN IMAGE SENSOR

[75] Inventor: Medford D. Sanner, Irving, Tex.

[73] Assignee: Recognition Equipment Incorporated, Irving, Tex.

[21] Appl. No.: 938,582

[22] Filed: Dec. 5, 1986

[51] Int. Cl.[4] .................................................. H04N 3/14
[52] U.S. Cl. ........................... 358/213.26; 358/213.18
[58] Field of Search ........................ 358/213.18, 213.26, 358/213.27

[56] References Cited

U.S. PATENT DOCUMENTS

| | | | |
|---|---|---|---|
| 4,435,730 | 3/1984 | Bendell et al. | 358/213.26 |
| 4,580,170 | 4/1986 | Levine | 358/213.26 |
| 4,584,609 | 4/1986 | Klein et al. | 358/213 |
| 4,677,490 | 6/1987 | Levine | 358/213.18 |
| 4,679,090 | 7/1987 | Erhardt | 358/213.18 |
| 4,734,775 | 3/1988 | Blom | 358/221 |

Primary Examiner—Jin F. Ng
Assistant Examiner—Stephen Brinich
Attorney, Agent, or Firm—Richards, Harris, Medlock & Andrews

[57] ABSTRACT

An image processor (10) for use with an image sensor (12) is provided. The image sensor includes two output channels (14, 16) for producing video signals in the form of a clock signal carrier which is amplitude modulated by picture element signal levels sensed by the image sensor (12). A first filter (22) is connected to the image sensor (12) for removing the clock signal from the video signals produced by the image sensor which are produced on the first channel (14). A second filter (26) is connected to the image sensor (12) for receiving video signals from the second channel (16) for removing the clock signal from the video signals produced by the image sensor (12) produced on the second channel (16). The filtered video signals are combined in a multiplexer (40) to produce a single video signal.

18 Claims, 2 Drawing Sheets

DUAL CHANNEL SIGNAL PROCESSING SYSTEM FOR AN IMAGE SENSOR

TECHNICAL FIELD

This invention relates to image processing systems, and more particularly to a video processor for processing high frequency video signals produced by a self-scanning image sensor having two video output channels.

BACKGROUND ART

The development of solid state imaging devices has resulted in image sensors having high performance, high reliability, and ease of use with low power requirements. Self-scanning image sensors, such as, for example, charge coupled devices (CCD), utilize two separate video output channels, one channel representing odd picture elements (pixels) and the other channel representing even pixels. Charged coupled devices are a widely used architecture for solid state imaging devices. These devices store charge in a potential well and transfer the charge from one electrode area to an adjacent electrode area by application of voltages with appropriate time and phase relationships. A two channel output structure is utilized for high speed sensors in order to reduce the maximum output frequencies required by a single channel.

At high scanning rates, for example, 20M pixel per second, the video signal produced by a CCD sensor resembles a carrier frequency equal to the reset clock frequency of the sensor which is amplitude modulated by the pixel signal levels. For each channel output, one cycle of the carrier represents a pixel. When the two channels, which are 180° out of phase, are directly combined by summing or multiplexing, each cycle of the carrier represents two pixels. The output of the CCD sensor also contains clock noise at each output at the pixel output frequency which is much greater in amplitude than the pixel intensity signal itself. Therefore, at high clock frequencies there will be little, if any, plateau representing the pixel intensity, but instead, an output waveform results that resembles an amplitude modulated carrier frequency. Generally, the large amplitude of the clock signals presents problems in amplifying the sensor array outputs to produce useful modulation signal levels. The large clock swings will cause clipping or saturation of a video amplifier, thus distorting, if not removing the video signal.

At low frequency clock rates the array output signal will include a plateau interval in the waveform that represents the modulation or signal level for a pixel. This level can be captured using a sample and hold circuit producing a stair step type output signal that eliminates the clock modulation. However, for clocking rates in excess of 10 MHz, the plateau interval becomes very short or actually disappears. Sampling the video level becomes more difficult and the sampling is very sensitive to timing variations. The need has thus arisen for a video processing system which serves to recover the video signals from image sensors operating at their maximum clock frequency which produces a video output signal that is free of clock noise.

DISCLOSURE OF THE INVENTION

In accordance with the present invention, an image processing system is provided for use with an image sensor such as, for example, a charge coupled device, which substantially eliminates the problems heretofore associated with the use of such sensors at maximum clock frequencies by eliminating clock noise in the output signal.

In accordance with one aspect of the present invention, an image processor for use with an image sensor wherein the image sensor has two output channels, each of the channels producing video signals in the form of a clock signal carrier frequency which is modulated by picture element signal levels is provided. The processor includes a first filter connected to the image sensor for receiving video signals from one of the output channels for removing the clock signal from the video signals produced by the image sensor to produce filtered video signals. A second filter is connected to the image sensor for receiving video signals from the other one of the output channels for removing the clock signal from the video signals produced by the image sensor and for generating filtered video signals associated with the other channel. The filtered signals are combined to produce a single video signal that is free of clock noise.

DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION

Figure 1:
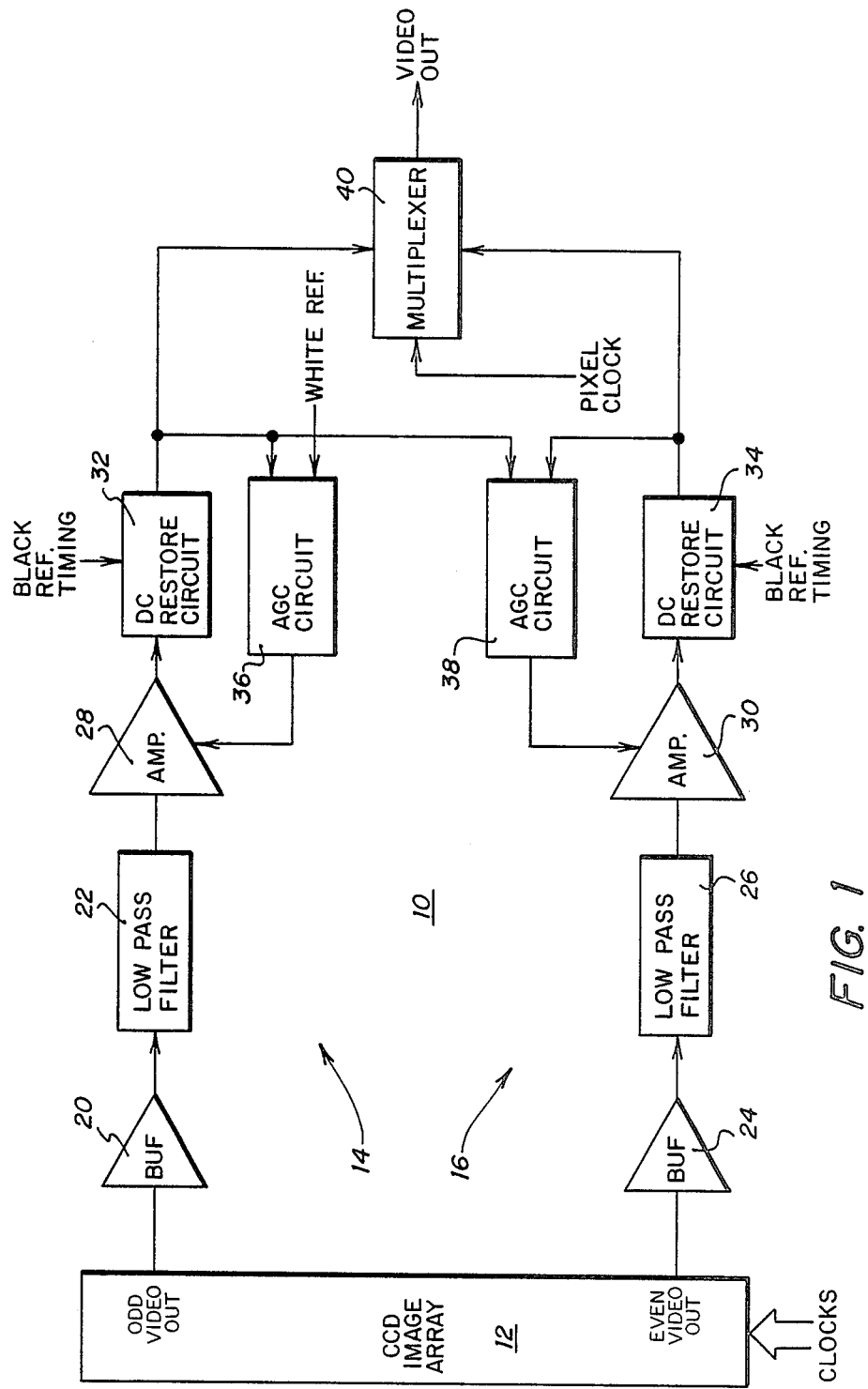
FIG. 1 is a block diagram of the present video processor.

Referring to FIG. 1, a block diagram of the present video processor is illustrated, and is generally identified by the numeral 10. Video processor 10 includes a CCD image array 12 having two separate video output channels 14 and 16. Channel 14 represents the odd video output picture elements while channel 16 represents the even video output picture elements. Image array 12 operates at a clock frequency, the speed at which the image data stored in the array can be shifted through the memory cells, of, for example, 20M pixels/sec. or 10M pixels/sec. per channel. The output of image array 12 to each channel 14 and 16 therefore represents a 10 MHz clock signal that is amplitude modulated by the pixel information. Image array 12 may comprise, for example, a model CCD 133 manufactured and sold by Fairchild or a model TCD 107C manufactured by Toshiba.

The output of channel 14 of image array 12 is applied through a buffer 20 to a low pass filter 22. Similarly, the output of channel 16 of image array 12 is applied through a buffer 24 to a low pass filter 26. Buffers 20 and 24 are identical and function to isolate image array 12 to prevent loading of image array 12 and to provide a device for driving low pass filters 22 and 26. Buffers 20 and 24 also function to drive the cable between image array 12 and low pass filters 22 and 26. Buffers 20 and 24 are DC buffers and may comprise, for example, buffers manufactured by Harris, model HA-5033 or manufactured by National, model LH0033.

An important aspect of the present invention is the use of low pass filters 22 and 26 which are linear phase type filters to prevent phase distortion of the signals appearing in channels 14 and 16. Filters 22 and 26 operate at a cut-off frequency of, for example, 7 MHz to thereby eliminate the 10 MHz clock signal present in the output channels 14 and 16 of image array 12. The outputs of filters 22 and 26 therefore will contain the modulation frequencies which contain pixel signal level information. filters 22 and 26 may comprise, for example, filters manufactured by Allen Avionics, model MVFL6P5 or manufactured by BAL Components, Ltd., England, model ULB0600.

Since the pixel signal level information is actually a frequency of information, which includes two pixels, two samples per cycle of the channel information is necessary. Therefore, sampling two pixels at 10 MHz represents a maximum information frequency of 5 MHz. This 5 MHz frequency in the signal level passes through filters 22 and 26 and therefore all clock noise is eliminated on channels 14 and 16. However, the output of filters 22 and 26 have a fairly low level signal since the image array typically operates at a low percentage of saturation in high speed applications. These output signal levels may lie in the range of 50 to 100 millivolts and therefore the output of filters 22 and 26 are applied to amplifiers 28 and 30, respectively. Amplifiers 28 and 30 are AC amplifiers and may comprise, for example, a model TL026 manufactured by Texas Instruments.

The output of amplifiers 28 and 30 are applied to DC restore circuits 32 and 34, respectively, in order to reference the amplified output signal in each channel 14 and 16 to a video reference level. The reference level ensures that a black signal is consistently represented by a predetermined voltage level. The reference timing signal for a black level signal is applied to DC restore circuits 32 and 34 through operation of image array 12 at the beginning of each line scan utilizing pixels that are masked off in image array 12 which represent black reference pixels.

The output of DC restore circuits 32 and 34 represents a signal level that is referenced to, for example, a black level, and provides a feedback path to an automatic gain control circuit 36 and 38, respectively. The output of DC restore circuit 32 is also applied to automatic gain control circuit 38. The output of automatic gain control circuits 36 and 38 are applied to amplifiers 28 and 30, respectively to control the operation of amplifiers 28 and 30. Automatic gain control circuits 36 and 38 function to minimize any variations in the operation of each channel 14 and 16 and also provides automatic compensation for differences in signal levels of the output channels 14 and 16 of image array 12. A white signal level reference is applied to automatic gain control circuit 36 to establish the signal level desired for the white portions of a document being scanned by image array 12.

By applying the output of DC restore circuit 32 to automatic gain control circuit 38 associated with channel 16, channel 16 operates as a slave channel to channel 14 which can be categorized as a master channel. In this configuration, channel 16 is reference to the peak level of channel 14. Automatic gain control circuits 36 and 38 may comprise, for example, operational amplifiers manufactured by RCA, model CA3080, or Texas Instruments, model TL072.

The output of DC restore circuit 32 represents odd pixels of image array 12 while the output of DC restore circuit 34 represents even pixels of image array 12. These pixels are combined by an analog multiplexer 40 which operates to switch between channels 14 and 16 to combine the pixels from channels 14 and 16 into a single output. Analog multiplexer 40 is clocked at the pixel clock rate. If the frequency of signals on channels 14 and 16 were 10 MHz, the combined output frequency of multiplexer 40 would be 20 MHz.

It therefore can be seen that by separately processing the outputs of image array 12 using the present dual filter approach, greater clock noise rejection can be achieved. Additionally, a full nyquist frequency band width is possible as compared to a maximum of about 75% band width where both the outputs of image array 12 are combined and subsequently filtered. Additionally, a custom filter is not required to optimize the signal data band width. The use of low pass filters in the present processor, replaces the need for very high speed sample and hold or peak detectors. The elimination of these sample and hold circuits minimize the criticality of timing adjustments. Additionally, the level of clock coupling into the video signal is not critical. Further, the use of low pass filters lowers the dynamic range of the video amplifiers utilized in the present video processor 10 because of the absence of large clock swings.

Figure 2:
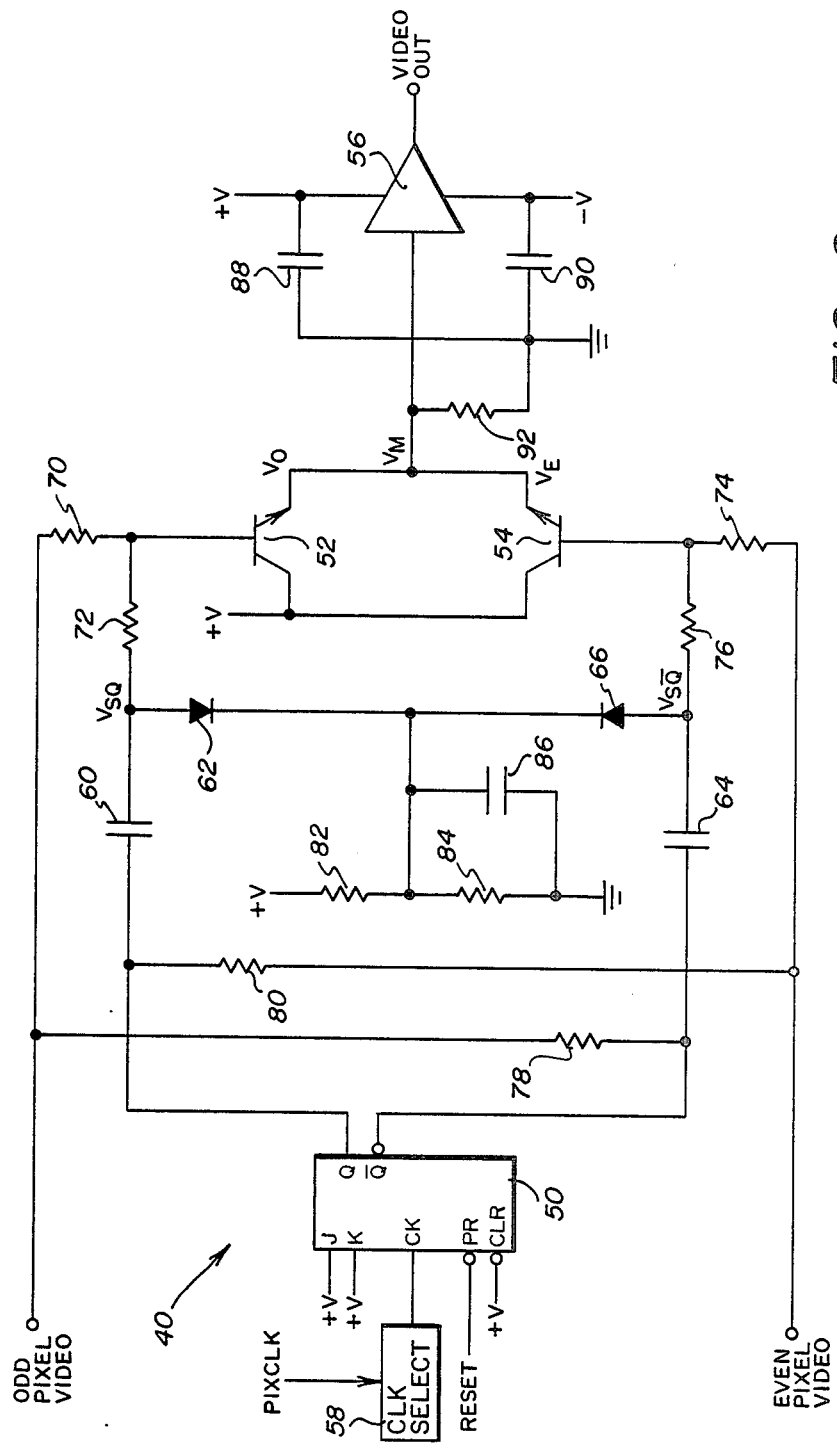
FIG. 2 is a block diagram of the multiplexer shown in FIG. 1.

Referring now to FIG. 2, an implementation of the circuitry comprising analog multiplexer 40 (FIG. 1) is illustrated. Multiplexer 40 includes a flip-flop 50 which is interconnected to transistors 52 and 54. Transistor 52 functions to sum the output of DC restore circuit 32 (FIG. 1) representing the odd pixel information with the Q output of flip-flop 50. The summing ratio for the odd pixel video and the Q output is determined by resistors 70 and 72. Transistor 54 functions to sum the output of DC restore circuit 34 (FIG. 1) representing the even pixel information with the $\overline{Q}$ output of flip-flop 50. The summing ratio for the even pixel video and the $\overline{Q}$ is determined by resistors 74 and 76. The output of transistors 52 and 54 are applied to an amplifier 56 which represents the video output signal of video processor 10.

Flip-flop 50 is clocked by the pixel clock signal applied through a clock select circuit 58 which functions to select a clock phase which controls the sampling between the odd and even channels to line-up with pixel intervals. The output of flip-flop 50 toggles between the Q and $\overline{Q}$ outputs controlled by the clock and synchronized by the reset signal at the start of each line scan and represents a squarewave. The Q output is AC coupled to the base of transistor 52 through a clamp circuit including a capacitor 60 and a diode 62. Similarly, the $\overline{Q}$ output of flip-flop 50 is AC coupled to the base of transistor 54 through a clamp circuit including a capacitor 64 and a diode 66. The AC coupling allows the voltage swings of Q and $\overline{Q}$ to be re-referenced to a selected voltage level. The positive swing of $V_{SQ}$ and $V_{S\overline{Q}}$ will be determined by the clamp circuit composed of resistors 82 and 84 and a capacitor 86. The most negative going level will be a function of the peak-to-peak output swing of flip-flop 50.

The odd and even input transfer functions of multiplexer 40 are represented by Equations 1 and 2 respectively.

$$V_o = (V_{odd} - V_{SQ}) \frac{R_{72}}{R_{72} + R_{70}} + V_{SQ} - V_{BE\,52} \quad (1)$$

$$V_o = (V_{even} - V_{S\overline{Q}}) \frac{R_{76}}{R_{76} + R_{74}} + V_{S\overline{Q}} - V_{BE\,54} \quad (2)$$

The values of resistors 70, 72, 74 and 76 are selected, such that the ratio of the value of resistor 72 to the sum of the value of resistors 72 and 70 is, for example, two-thirds and the ratio of the value of resistor 76 to the sum of the value of resistors 76 and 74 is, for example, two-thirds.

$V_{SQ}$ and $V_{\overline{SQ}}$ is a square wave having a voltage swing of, for example, 2.1 volts maximum and −1.4 volts minimum.

$V_o$ and $V_E$ represent a voltage in the range of, for example, 0 volts to 1.5 volts.

The sum of $V_o$ and $V_E$ is $V_M$ and is represented by Equation 3 as follows:

$$V_M = \tfrac{1}{2}(V_o + |V_o|) + \tfrac{1}{2}(V_E + |V_E|) \qquad (3)$$

To determine the maximum value of $V_{SQ}$ in the on condition using Equation 1, $V_{odd}$ is set equal to zero volts and Equation 1 is solved for the value of $V_{SQ}$ to produce a $V_o$ at zero volts, with $V_{BE\ 52}$ at 0.7 volts results in $V_{SQ}$ at 2.1 volts. Similarly $V_{\overline{SQ}}$ is 2.1 volts using Equation 2. To determine the minimum value of $V_{SQ}$ in the off condition using Equation 1, $V_{odd}$ is set equal to 1.5 volts and Equation 1 is solved for the value of $V_{SQ}$ to produce a $V_o$ at zero or less volts, with $V_{BE}$ at 0.7 volts, results in $V_{SQ}$ at −0.9 volts. Similarly $V_{\overline{SQ}}$ is −0.9 volts using Equation 2.

When Q is high, transistor 52 is biased on and since $\overline{Q}$ is low, transistor 54 is biased off. The output of channel 16 from DC restore circuit 34 is effectively locked out when Q is high. Similarly, when Q is low, $\overline{Q}$ is high to turn off transistor 52 and allow transistor 54 to conduct. The toggling of flip-flop 50 allows the alternate sampling of channels 14 and 16 through operation of transistors 52 and 54 to generate a combined output signal at the output of multiplexer 40.

Resistors 78 and 80 are utilized to cancel glitches in each channel 14 and 16, respectively. Capacitors 88 and 90 are utilized to suppress noise on the power supplies, and resistor 92 is the load resistor for transistors 52 and 54.

Therefore it can be seen that the present invention provides for a video processor that recovers video signals from image sensors operating at their maximum clock frequency to combine signals from two channels into a single video output that is free of clock noise, amplitude normalized and referenced to a black level.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. An image processor for use with an image sensor, the image sensor having two output channels, each of the channels providing video signals in the form of a clock signal carrier frequency which is modulated by picture element signal levels sensed by the image sensor including:
   first filter means connected to the image sensor for receiving video signals from one of the output channels for removing the clock signal from the video signals produced by the image sensor and for generating filtered video signals;
   second filter means connected to the image sensor for receiving video signals from the other one of the output channels for removing the clock signal from the video signals produced by the image sensor and for generating filtered video signals; and
   a clocked analog multiplexer for combining said filtered video signals produced by said first and said second filter means into a single video signal.

2. The image processor of claim 1 wherein said first and said second filter means comprise low pass filters.

3. The image processor of claim 2 wherein said low pass filters comprises linear phase-type low pass filters.

4. The image processer of claim 1 wherein said analog multiplexer means includes:
   means for generating a square wave signal;
   means for summing said square wave signal with said filtered video signals produced by said first and said second filter means for generating a summed signal; and
   switch means for receiving said summed signal to generate said single video signal.

5. An image processor comprising:
   an image sensor having first and second output channels for producing video signals on each of said output channels having a clock signal and a picture element signal sensed by said image sensor;
   first filter means connected to said first output channel for removing the clock signal from the video signal of said first output channel and for producing a filtered video signal;
   second filter means connected to said second output channel for removing the clock signal from the video signal of said second output channel and for producing a filtered video signal; and
   a clocked analog multiplexer connected to said first and said second filter means for combining said filtered video signals into a single video signal.

6. The image processor of claim 5 wherein said analog multiplexer means includes:
   means for generating a square wave signal;
   means for summing said square wave signal with said filtered video signals produced by said first and second filter means for generating a summed signal; and
   switch means for receiving said summed signal to generate said single video signal.

7. The image processor of claim 5 and further including:
   means connected to said first filter means and means connected to said second filter means for restoring a DC level to said filtered video signals.

8. The image processor of claim 5 and further including:
   means connected to said first filter means and means connected to said second filter means for amplifying said filtered video signals.

9. The image processor of claim 5 and further including:
   first amplifier means connected to said first filter means for amplifying said filtered video signal of said first channel;
   first restore means connected to said first amplifier means for restoring a DC level to said filtered video signal of said first channel;
   second amplifier means connected to said second filter means for amplifying said filtered video signal of said second channel; and
   second restore means connected to said second amplifier means for restoring a DC level to said filtered video signal of said second channel.

10. The image processor of claim 9 and further including:

first control means disposed between the output of said first restore means and said first amplifier means for controlling the gain of said first amplifier means; and second control means disposed between the output of said second restore means and said second amplifier means for controlling the gain of said second amplifier means.

11. The image processor of claim 10 and further including:
means for applying the output of said first restore means to said second control means, such that the gain of said second channel tracks the gain of said first channel.

12. The image processor of claim 5 wherein said first filter means and said second filter means comprise low pass filters.

13. An analog multiplexer for receiving first and second video signals to produce a single video output signal comprising:
means for generating a square wave signal having positive and negative portions;
means for summing the positive portion of said square wave with the first video signal and for generating a first summed signal;
means for summing the negative portion of said square wave with the second video signal and for generating a second summed signal; and
switch means for receiving said first and second summed signals, said switch means being alternatively activated by said summed signals for generating the single video output signal.

14. The multiplexer of claim 13 wherein said means for generating said square wave includes flip-flop means.

15. An image processor comprising:
an image sensor having first and second output channels for producing video signals on each of said output channels having a clock signal and a picture element signal sensed by said image sensor;
first filter means connected to said first output channel for removing the clock signal from the video signal of said first output channel and for producing a filtered video signal;
second filter means connected to said second output channel for removing the clock signal from the video signal of said second output channel and for producing a filtered video signal;
means connected to said first and said second filter means for combining said filtered video signals into a single video signal;
first amplifier means connected to said first filter means for amplifying said filtered video signal of said first channel;
first restore means connected to said first amplifier means for restoring a DC level to said filtered video signal of said first channel;
second amplifier means connected to said second filter means for amplifying said filtered video signal of said second channel;
second restore means connected to said second amplifier means for restoring a DC level to said filtered video signal of said second channel;
first control means disposed between the output of said first restore means and said first amplifier means for controlling the gain of said first amplifier means; and
second control means disposed between the output of said second restore means and said second amplifier means for controlling the gain of said second amplifier means.

16. The image processor of claim 15 and further including:
means for applying the output of said first restore means to said second control means, such that the gain of said second channel tracks the gain of said first channel.

17. An image processor for use with an image sensor, the image sensor having two output channels, one of the output channels generating a first set of picture elements and the second of the output channels generating different second set of picture elements, and each of the channels providing video signals in the form of a clock signal carrier frequency which is modulated by picture element signal levels sensed by the image sensor including:
first filter means connected to the image sensor for receiving the first set of picture elements from one of the output channels for removing the clock signal from the video signals produced by the image sensor and for generating filtered video signals;
second filter means connected to the image sensor for receiving the second set of picture elements from the other one of the output channels for removing the clock signal from the video signals produced by the image sensor and for generating filtered video signals; and
means for combining said filtered video signals produced by said first and said second filter means into a single video signal including the first and second sets of picture elements.

18. The image processor of claim 17 wherein said means for combining includes an analog multiplexer.

* * * * *